(12) United States Patent
Robinson

(10) Patent No.: US 12,263,774 B2
(45) Date of Patent: Apr. 1, 2025

(54) TAILGATE CHAIN LINKAGE

(71) Applicant: Caterpillar SARL, Geneva (CH)

(72) Inventor: Mark Robinson, Durham (GB)

(73) Assignee: Caterpillar SARL, Geneva (CH)

( * ) Notice: Subject to any disclaimer, the term of this patent is extended or adjusted under 35 U.S.C. 154(b) by 287 days.

(21) Appl. No.: 17/909,629

(22) PCT Filed: Feb. 22, 2021

(86) PCT No.: PCT/EP2021/025074
§ 371 (c)(1),
(2) Date: Sep. 6, 2022

(87) PCT Pub. No.: WO2021/175489
PCT Pub. Date: Sep. 10, 2021

(65) Prior Publication Data
US 2023/0104629 A1    Apr. 6, 2023

(51) Int. Cl.
*B60P 1/267* (2006.01)
*B62D 33/027* (2006.01)
(52) U.S. Cl.
CPC ............ *B60P 1/267* (2013.01); *B62D 33/027* (2013.01)
(58) Field of Classification Search
CPC .... B60P 1/26; B60P 1/267; B60P 1/28; B60P 1/283; B62D 33/027; B62D 33/0273; B62D 33/03
USPC .......................... 296/50, 56, 57.1, 58, 183.2
See application file for complete search history.

(56) References Cited

U.S. PATENT DOCUMENTS

| | | | | |
|---|---|---|---|---|
| 1,522,162 | A * | 1/1925 | Newton | B60P 1/26 |
| | | | | 298/23 B |
| 4,678,235 | A * | 7/1987 | Hagenbuch | B60P 1/267 |
| | | | | 298/23 DF |
| 5,174,632 | A * | 12/1992 | Hagenbuch | B60P 1/267 |
| | | | | 296/183.2 |
| 5,474,363 | A | 12/1995 | Hagenbuch | |
| 5,890,867 | A | 4/1999 | Hagemeyer | |
| 6,302,491 | B1 | 10/2001 | Anderson | |
| 6,517,143 | B2 | 2/2003 | Hagenbuch | |
| 6,796,602 | B2 * | 9/2004 | Hagenbuch | B60P 1/267 |
| | | | | 298/23 D |
| 9,487,120 | B1 | 11/2016 | Hinson | |

(Continued)

FOREIGN PATENT DOCUMENTS

CN            208498347 U     2/2019

OTHER PUBLICATIONS

International Search Report related to Application No. PCT/EP2021/025074; reported on May 25, 2021.

(Continued)

*Primary Examiner* — Jason S Daniels

(57) ABSTRACT

A chain connector for use with a tailgate chain linkage of a machine. The chain connector comprises a first flange, a second flange and a web. The chain connector provided with a first pair of apertures for coupling the chain connector to the machine, and a plurality of second pairs of apertures for coupling the chain connector to a chain. An effective length of the tailgate chain linkage may be adjusted by coupling the chain with a selected second pair of apertures since the plurality of second pairs of apertures are disposed at a plurality of distances from the first pair of apertures.

24 Claims, 8 Drawing Sheets

(56) References Cited

U.S. PATENT DOCUMENTS

2005/0073188 A1* 4/2005 O'Brien .................. B60P 1/26
  298/23 F
2010/0147786 A1   6/2010 Hamilton

OTHER PUBLICATIONS

Great Britain Search Report related to Application No. 2003213.2; reported on Aug. 25, 2020.

* cited by examiner

TAILGATE CHAIN LINKAGE

CROSS-REFERENCE TO RELATED APPLICATION

This application is a USC $371 US National Stage filing of International Application No. PCT/EP2021/025074 filed on Feb. 22, 2021 which claims priority under the Paris Convention to Great Britain Patent Application 2003213.2 filed on Mar. 5, 2020.

BACKGROUND

The present disclosure relates to tailgate chain linkages. In particular, it relates to a chain connector, a tailgate chain linkage comprising a chain connector, and a machine comprising a tailgate chain linkage.

Certain machines, for example those for use in the construction and mining industries, may comprise a trailer provided with a container for receiving cargo. The container may comprise a rear opening for emptying the container when the container is inclined. The machine may be provided with a tailgate for closing the rear opening. A tailgate chain linkage may be provided for controlling the movement of the tailgate with respect to the container.

CN208498347U describes an articulated dump truck having a cargo box and a cargo box tailgate. The tailgate includes a side arm, a chain and a mounting plate that is attached at a side of the frame of the articulated dump truck. The mounting plate is provided with a shackle for connecting the chain to the mounting plate. In use when the cargo box is inclined the chain and side arm cooperate with the tailgate to open the tailgate.

SUMMARY OF THE DISCLOSURE

Embodiments of the present disclosure provide a chain connector for use with a tailgate chain linkage of a machine for operating the tailgate of the machine. In some embodiments, the chain connector comprises a pair of flanges, a first flange and a second flange with a web disposed between the first flange and the second flange.

The first flange and the second flange include pairs of apertures, formed in an end of the first flange and the second flange, respectively, where each of the pairs of apertures comprises a first aperture in the first flange and a second aperture in the second flange with the first aperture and second aperture of each pair of apertures being aligned with each other.

The pairs of apertures provide for coupling the chain connector to an attachment plate of the machine, where the pairs of apertures are disposed on an end of the chain connector such that an effective length of the tailgate chain linkage may be adjusted by coupling the chain of the chain linkage with a selected pair of the apertures.

The present disclosure also provides a tailgate chain linkage of a machine comprising the chain connector.

The present disclosure also provides a machine comprising the tailgate chain linkage.

BRIEF DESCRIPTION OF THE DRAWINGS

One or more embodiments of the disclosure will now be described, by way of example only, with reference to the accompanying drawings in which.

DETAILED DESCRIPTION

Figure 1:
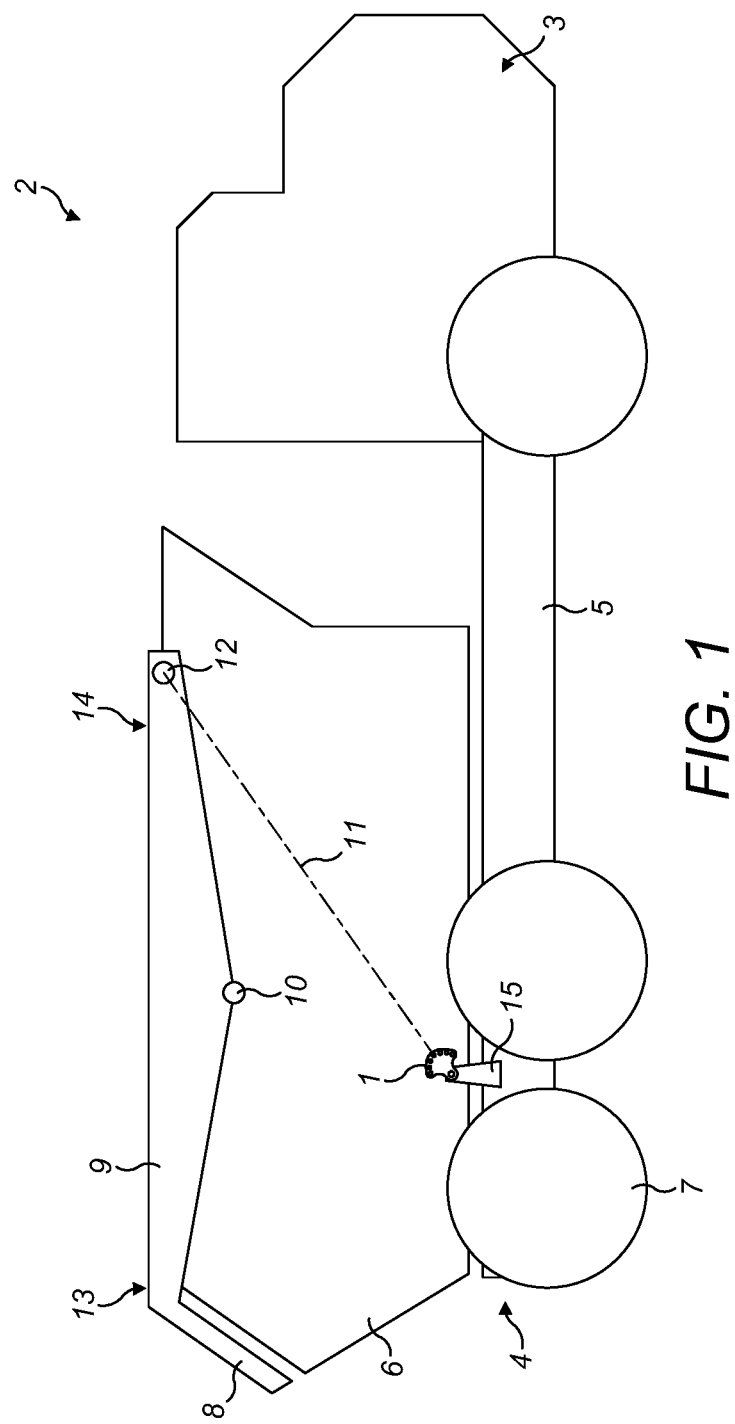
FIG. 1 is a schematic view of a machine comprising a chain connector, according to some embodiments of the present disclosure, in a first configuration.

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

In this specification, the use of the singular includes the plural unless the context clearly dictates otherwise. In this application, the use of "or" means "and/or" unless stated otherwise.

In this specification, ranges and amounts may be expressed as "about" a particular value or range. About also includes the exact amount. For example, "about 5 mm" means "about 5 mm" and also "5 mm." Generally, the term "about" includes an amount that would be expected to be within experimental error. The term "about" includes values that are within 5% less to 5% greater of the value provided. For example, "about 30 mm" means "between 28.5 mm and 31.5 mm."

Chains used in tailgate chain linkages can have a high variability in length. In addition, a stack-up of tolerances in the parts of the tailgate chain linkage and a chassis of the machine can lead to undesirable variation in the speed of opening of the tailgate.

The tailgate chain linkage according to the present disclosure can: accommodate chains with varying lengths; provide for changing active chain length to adjust tailgate opening parameters; provide flexibility to adapt the tailgate chain linkage to changes in machine parameters and/or the like.

The tailgate chain linkage, in accordance with the present disclosure, is robust and can function properly in adverse conditions, which conditions may include impacts during loading, unloading etc. The tailgate linkage as provided herein is capable of secure/unobtrusive installation on the machine. The tailgate linkage according to the disclosure can be lightweight, reducing fuel economy impact, and does not require moving parts to adjust to changes in chain length. The tailgate chain linkage has an ergonomic and simple/intuitive design and provides for improved operator experience and operation of the linkage system in the field.

The tailgate chain linkage in some embodiments has a two-part design, where the two parts, two flanges, each comprise orifices, which when paired form a secure chain linkage orifice and a separation between the pairs of orifices forms a chain guide. This design provides for low manufacture costs and results in a robust component that prevent/limits adverse interactions between the chain and the tailgate chain linkage and/or the machine. Moreover, the chain linkage orifice provided by the pair of orifices provides two separated contact points for interaction with a bolt that may be threaded though the pair of orifices to couple the chain to the tailgate chain linkage, which separated contact points may provide more stability to the bolt and/or reduce damage to the tailgate chain linkage resulting from repeated operation of the tailgate.

In some embodiments, the two flanges may have a mushroom shape, which shape may provide for a robust easy to manufacture component, which at the same time allows an operator to make adjustments to handle chains of a wide range of lengths.

Figure 2:
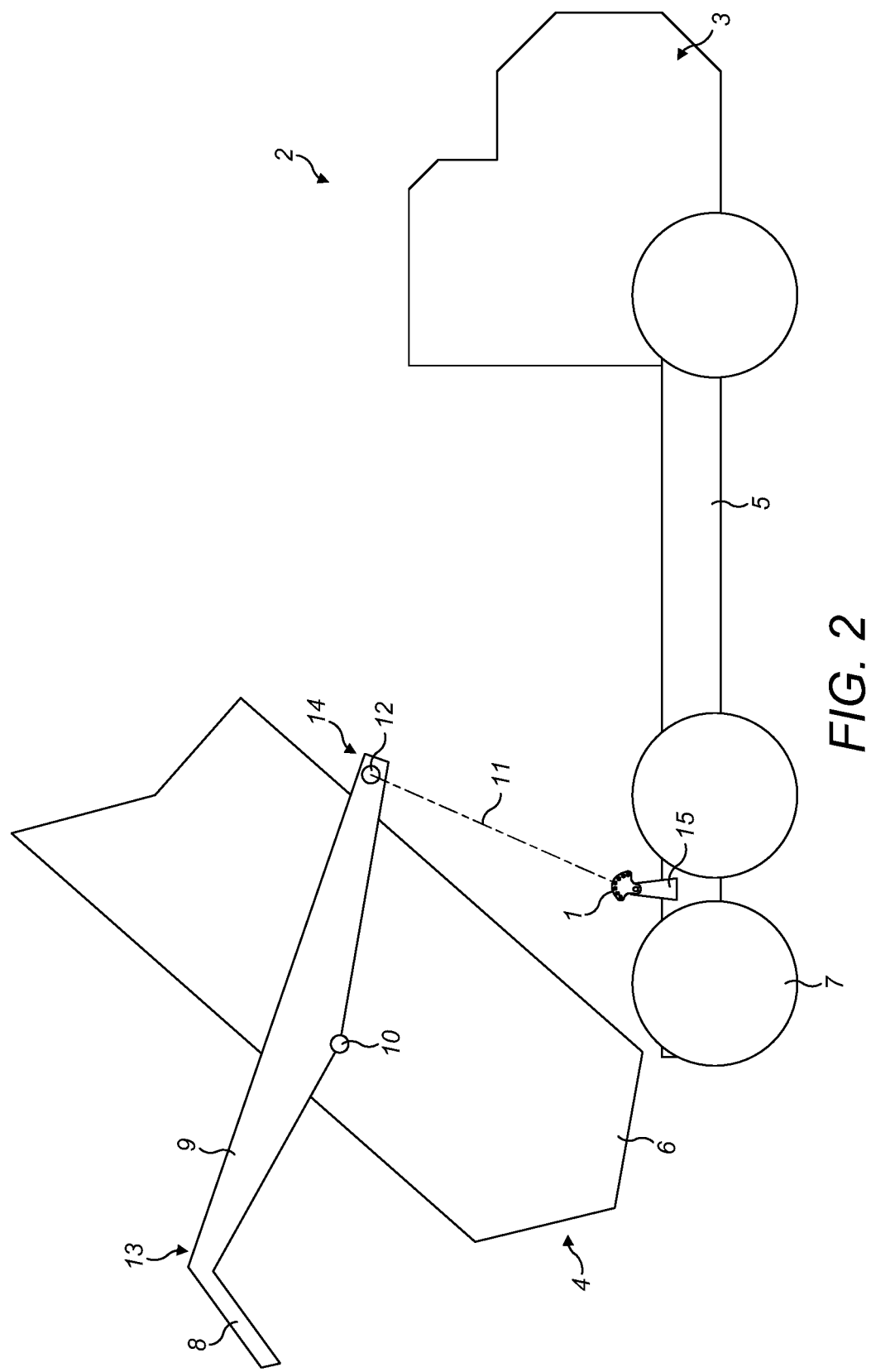
FIG. 2 is a schematic view of the machine of FIG. 1 in a second configuration.

FIGS. 1 and 2 show schematic views of a machine 2. The machine 2 may be, by way of example, an off-road machine. The machine 2 may be for use in the construction industry, mining industry or the like. The machine 2 may be an articulated machine. The machine 2 may comprise a tractor 3 and a trailer 4. Wheels 7 may be provided on the tractor 3 and/or trailer 4. Additionally or alternatively, tracks may be provided for locomotion. The trailer 4 may be articulated relative to the tractor 3. The machine 2 may be a dump truck. The machine 2 may be an articulated dump truck.

The machine 2 may comprise a chassis 5. The tractor 3 and trailer 4 may comprise individual chassis. Alternatively, a common chassis may be provided for both the tractor 3 and the trailer 4.

The trailer 4 may comprise a container 6 for receiving and holding a cargo. The container 6 may define an interior for holding the cargo. The container 6 may comprise a base, a front wall, two side walls and a rear wall. The container 6 may comprise an open upper aspect to enable dumping of cargo into the container 6. The rear wall may be omitted or may be of reduced height compared to the side walls. A rear opening may be provided in or instead of the rear wall.

The container 6 may be movable between a first configuration, as shown in FIG. 1, and a second configuration, as shown in FIG. 2.

The first configuration may be a lowered configuration. In the lowered configuration the base of the container 6 may be level or approximately level and/or in proximity with the chassis 5. The lowered configuration may be adopted when the machine 2 is driving across terrain.

The second configuration may be a raised configuration. In the raised configuration the base of the container 6 may be inclined away from the chassis 5 to urge the cargo in the container 6 to exit the interior of the container through the rear opening under the action of gravity. The raised configuration may be adopted during emptying of the container 6.

The container 6 may be moved between the first and second configurations by an hydraulic mechanism, for example an hydraulic piston or ram operatively coupled between the chassis 5 and the container 6.

The machine 2 may further comprise a tailgate 8 for closing at least a portion of the rear opening of the container 6. The tailgate 8 may be shaped and sized to close substantially the whole of the rear opening. The tailgate 8 may extend laterally between the side walls of the container 6. The tailgate 8 may be movable relative to the container 6 so as to close and open the rear opening of the container 6.

The tailgate 8 may be mounted to, or formed integrally with, one or more tailgate arms 9. Two tailgate arms 9 may be provided, one arranged on each side of the tailgate 8. The tailgate 8 may be mounted or formed at or near a first end 13 of the tailgate arms 9.

Each tailgate arm 9 may comprise an elongate body which may be rotatably mounted at a pivot 10 to the container 6. The pivot 10 may be located approximately midway along the length of the elongate body of the tailgate arm 9.

Each tailgate arm 9 may be coupled to the machine 2 by a chain 11. The chain 11 may be a chain formed from links. The chain 11 may be coupled to the tailgate arm 9 at a coupling location 12. The coupling location 12 may be on an opposite side of the pivot 10 to the tailgate 8. The coupling location 12 may be located at or near a second end 14 of the tailgate arm 9.

The chain 11 may be coupled to a stanchion 15 of the machine 2. The stanchion 15 may be mounted to the machine 2, for example to a chassis 5 of the machine 2.

The chain 11 may be coupled to the machine 2 via a chain connector 1. For example, the chain 11 may be coupled to the chain connector 1 and the chain connector 1 coupled in turn to the machine 2. In one example, the chain connector 1 may be coupled to the stanchion 15. The chain connector 1 may alternatively be coupled between the chain 11 and the tailgate arm 9. A chain connector 1 may be provided at each end of the chain 11.

The chain connector 1 and the chain 11 may together comprise a tailgate chain linkage. The tailgate chain linkage may comprise two chains 11 and two chain connectors 1—with a chain 11 and chain connector 1 for each side of the machine 2 where two tailgate arms 9 are provided.

Figure 3:
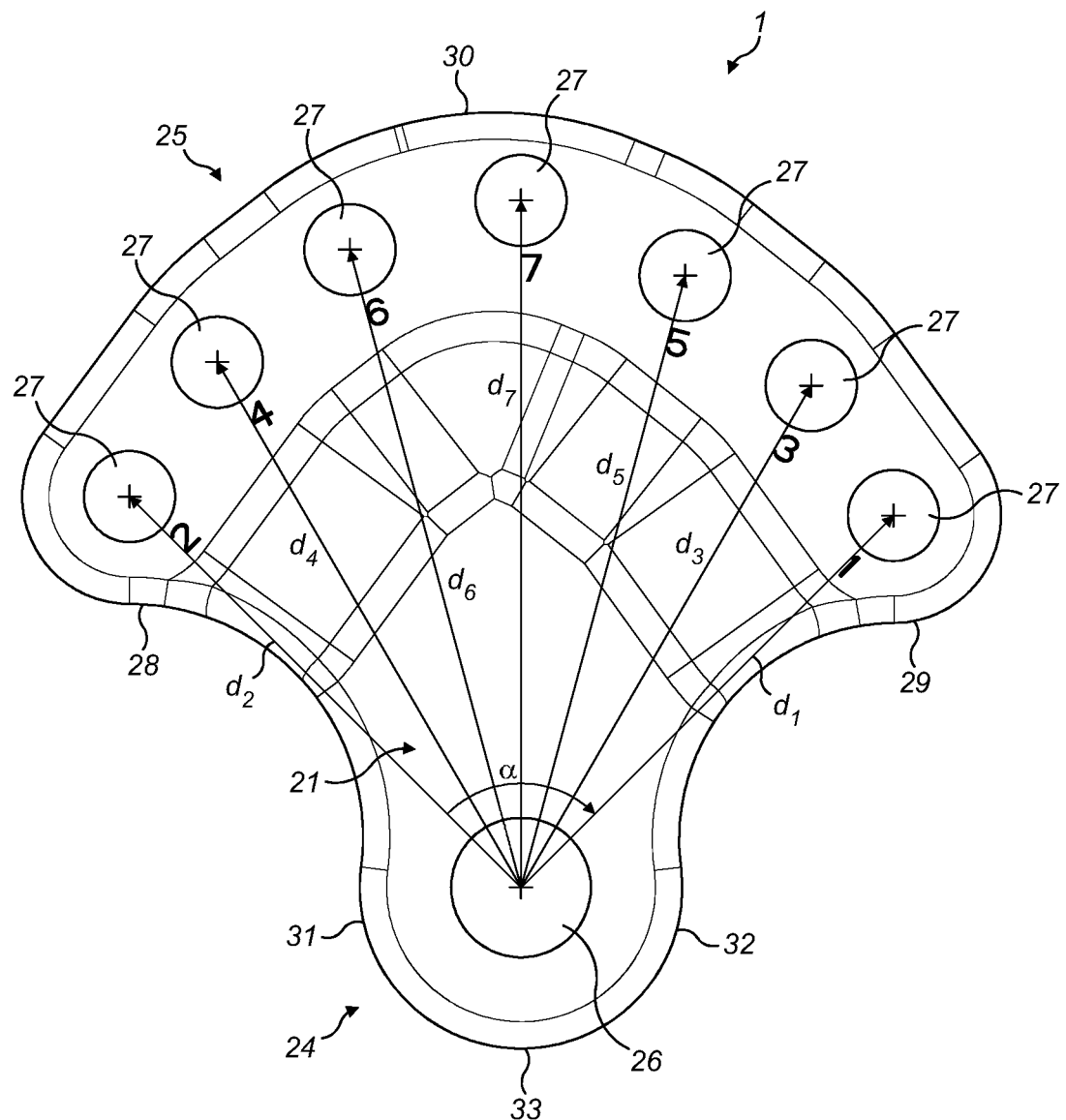
FIG. 3 is front view of a chain connector according to some embodiments of the present disclosure.
Figure 4:
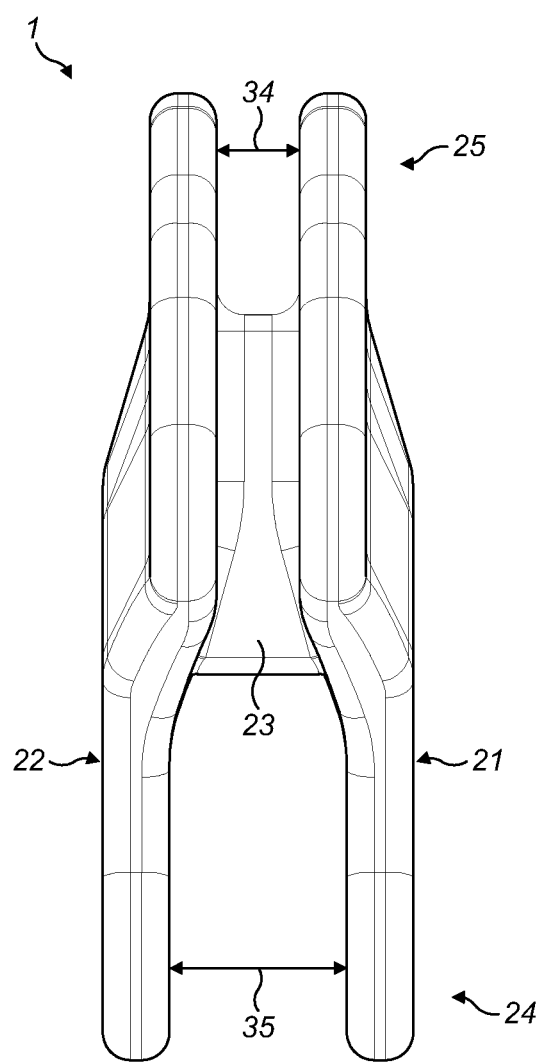
FIG. 4 is a side view of the chain connector of FIG. 3.
Figure 5:
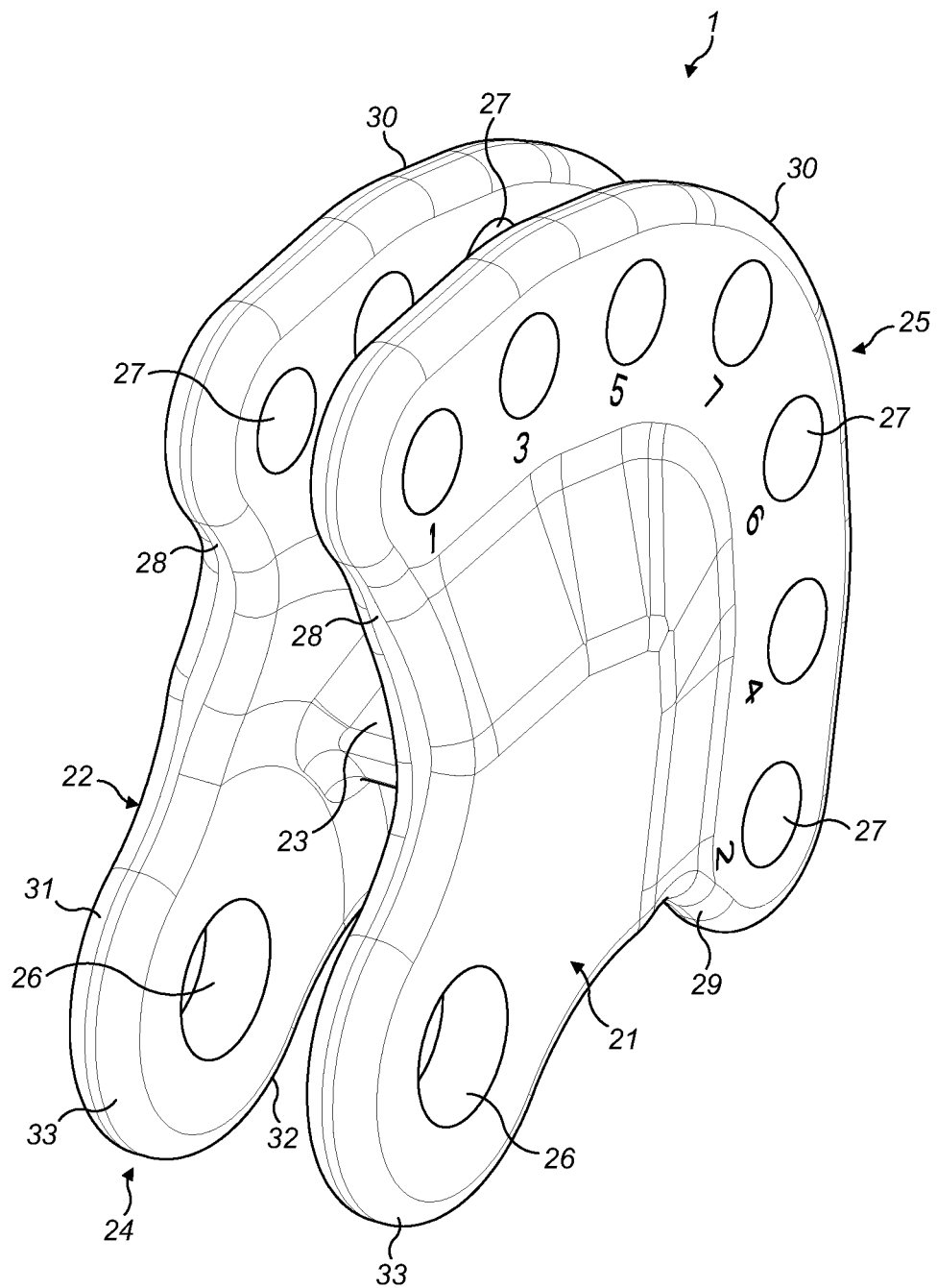
FIG. 5 is a perspective view of the chain connector of FIG. 3.
Figure 6:
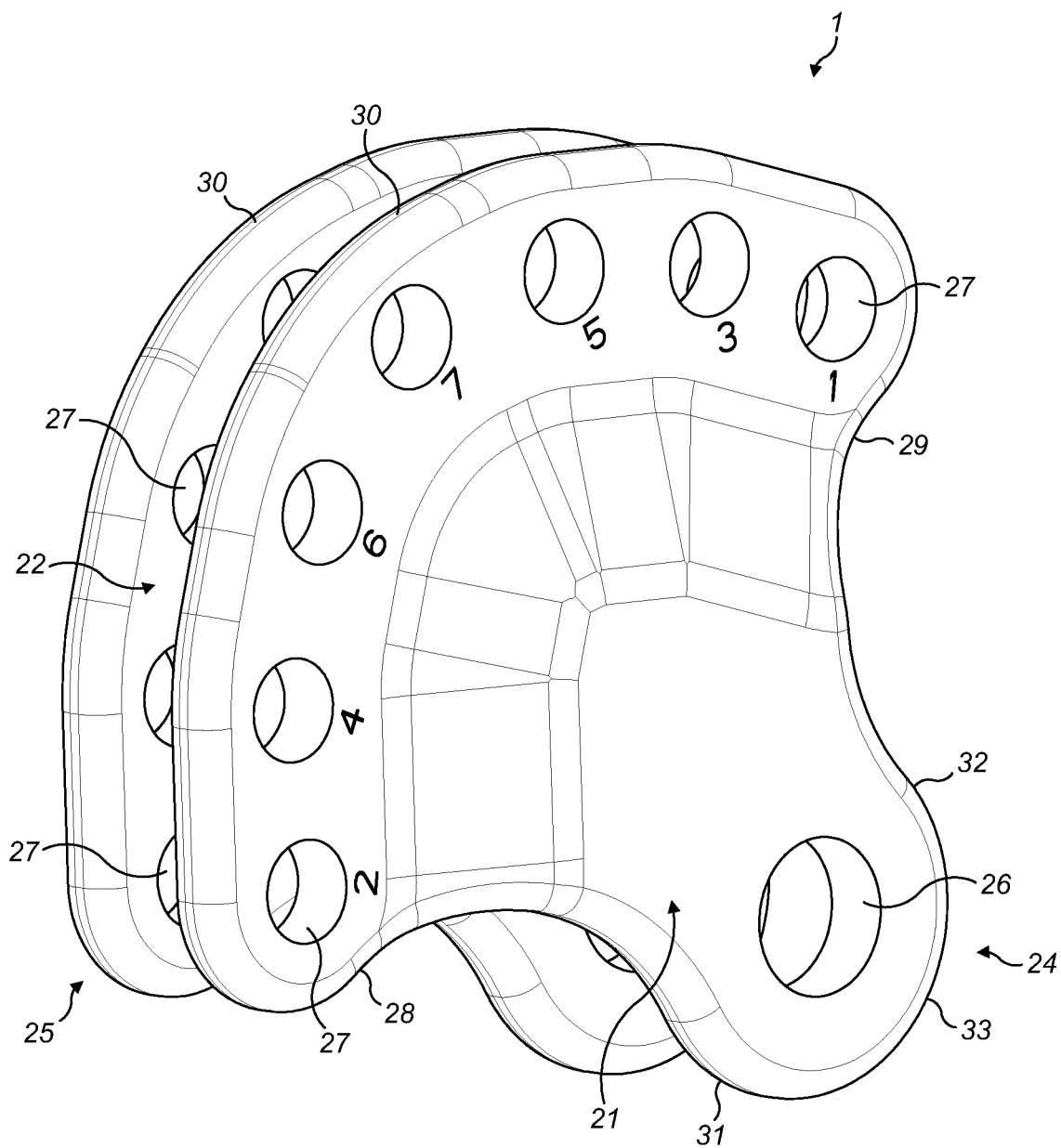
FIG. 6 is another perspective view of the chain connector of FIG. 3.

FIGS. 3 to 6 show an example of a chain connector 1 according to the present disclosure. As shown in FIGS. 5 and 6, the chain connector 1 comprises a first flange 21, a second flange 22 and a web 23 extending between the first flange 21 and the second flange 22. The first flange 21, the second flange 22 and the web 23 may be an integral body. The first flange 21, the second flange 22 and the web 23 may be formed as a unitary casting, a unitary moulding, a unitary machined part, or a unitary 3D printed item. The chain connector 1 may be formed from a metal or metal alloy, for example iron or steel.

The first flange 21 and the second flange 22 may be mirror images of each other.

The first flange 21 and the second flange 22 each have a first end 24 and a second end 25. The web 23 may extend between the second ends 25 of the first flange 21 and the second flange 22 as shown in FIG. 4.

As shown in FIG. 4, the second ends 25 of the first flange 21 and the second flange 22 may be spaced apart by between 10 and 20 mm, optionally by about 15 mm. The first ends 24 of the first flange 21 and the second flange 22 may be spaced apart by between 25 and 40 mm, optionally by about 32 mm.

Each first end 24 may be relatively narrow in comparison to each second end 25. Each first end 24 may comprise a stem portion and each second end 25 may comprise a head portion.

As shown in FIG. 3, each head portion may comprise a left lateral edge 28, a right lateral edge 29 and a distal edge 30. Each stem portion may comprise a left lateral edge 31, a right lateral edge 32 and a proximal edge 33.

The distal edge 30 of each head portion may be convex and may extend from the left lateral edge 28 to the right lateral edge 29. The left lateral edge 28 and the right lateral edge 29 of each head portion may be concave and may both smoothly blend into the left lateral edge 31 and the right lateral edge 32 of the respective stem portion.

In one example, each head portion may be mushroom-shaped.

As shown in FIGS. 1 and 6, the first flange 21 and the second flange 22 comprise pairs of apertures 26, 27. Each pair of apertures 26, 27 comprises a first aperture in the first flange 21 and a second aperture in the second flange 22. The first aperture and second aperture of each pair of apertures 26, 27 are aligned with each other. This alignment may enable the insertion of a fixative through each pair of apertures 26, 27. The fixative may be, for example, a nut and bolt.

The pairs of apertures 26, 27 comprise a first pair of apertures 26 which are disposed in the first ends 24 of the first flange 21 and the second flange 22. The first pair of apertures 26 may be used for coupling the chain connector 1 to an attachment plate of the machine 2. A fixative, for example a nut and bolt, may be used for coupling the chain connector 1 to the attachment plate.

The pairs of apertures 26, 27 further comprise a plurality of second pairs of apertures 27 that are disposed in the second ends 25 of the first flange 21 and the second flange 22.

These second pairs of apertures 27 may be used for coupling the chain connector 1 to the chain 11, which may be part of the tailgate chain linkage. A fixative, for example a nut and bolt, may be used for coupling the chain connector 1 to the chain 11. The second pairs of apertures 27 may be provided with identifying markings to enable a user to distinguish each pair of the plurality of second pairs of apertures 27. For example, as shown in FIG. 1, numerical markings may be provided in the vicinity of each pair of the plurality of second pairs of apertures 27.

The first pair or apertures 26 and the plurality of second pairs of apertures 27 may each have and axis and the axes may be parallel to each other.

As shown in FIG. 1, the plurality of second pairs of apertures 27 are disposed at a plurality of distances $d_1$-$d_7$ from the first pair of apertures 26. In this way an effective length of the tailgate chain linkage may be adjusted by coupling the chain 11 of the chain linkage with a selected second pair of apertures 27 of the plurality of second pairs of apertures 27.

The plurality of second pairs of apertures 27 may each be disposed at a different distance $d_1$-$d_7$ from the first pair of apertures 26.

In this specification the distances $d_1$-$d_7$ are measured as the perpendicular distance between the axis of the first pair of apertures 26 and the axis of the respective second pair of apertures 27.

The plurality of distances $d_1$-$d_7$ from the first pair of apertures 26 may comprise a minimum distance $d_1$ from the first pair of apertures 26 and a maximum distance $d_7$ from the first pair of apertures 26. The maximum distance $d_7$ minus the minimum distance $d_1$ may define a 'distance range' covered by the plurality of second pairs of apertures 27. The distance range may be up to 50 mm, optionally up to 40 mm, optionally up to 35 mm, optionally up to 30 mm, optionally up to 20 mm.

The minimum distance $d_1$ of the plurality of second pairs of apertures 27 from the first pair of apertures 26 may be between 90 and 110 mm, optionally about 100 mm. The maximum distance $d_7$ of the plurality of second pairs of apertures 27 from the first pair of apertures 26 may be between 120 and 140 mm, optionally about 130 mm.

The plurality of second pairs of apertures 27 may be arranged in one or more arcs, optionally in a single arc. The one or more arcs or the single arc may subtend an angle α centred on the first pair of apertures 26 of between 60° and 120°, optionally 75° to 105°, optionally about 90°.

The plurality of second pairs of apertures 27 may be ordered so that the distance $d_1$-$d_7$ from the first pair of apertures 26 increases sequentially from one lateral side of the chain connector 1 to the other. Alternatively, a different ordering may be provided. In the example of FIG. 1, the ordering (from left lateral edge 28 to right lateral edge 29) is $d_2$, $d_4$, $d_6$, $d_7$, $d_5$, $d_3$, $d_1$.

The first pair of apertures 26 may consist of a single first pair of apertures 26. The plurality of second pairs of apertures 27 may comprise at least 3 second pairs of apertures, optionally at least 5 second pairs of apertures, optionally 3 to 10 second pairs of apertures, optionally 4 to 8 second pairs of apertures, optionally 6 to 8 second pairs of apertures, optionally 7 second pairs of apertures. The plurality of second pairs of apertures 27 may consist of 3, 4, 5, 6, 7, 8, 9 or 10 second pairs of apertures 27.

INDUSTRIAL APPLICABILITY

The chain connector 1 of the present disclosure is useful for forming a part of a tailgate chain linkage of a machine 2. The tailgate chain linkage may be used for controlling the movement of the tailgate 8 with respect to the container 6. The machine 2 may comprise one tailgate chain linkage or alternatively two tailgate chain linkages—one disposed on each side of the container 6.

Figure 7:
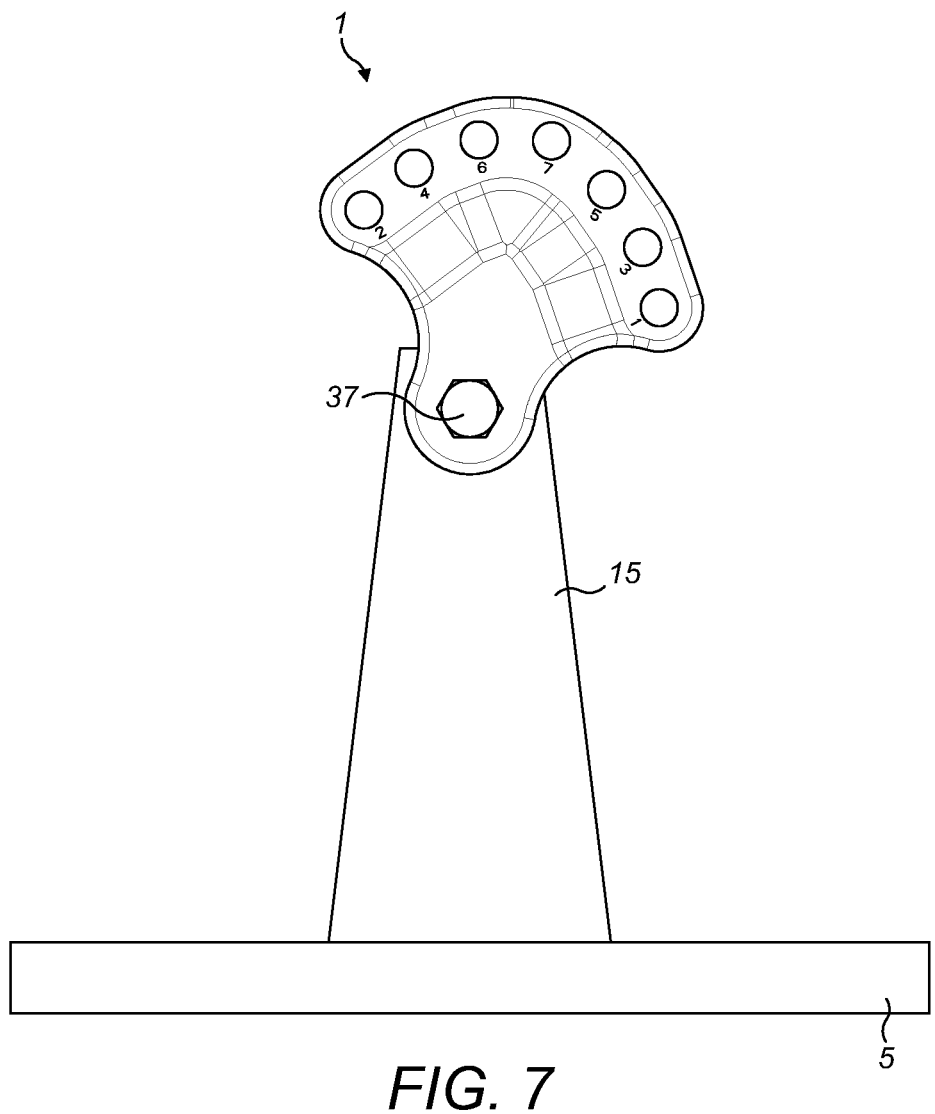
FIG. 7 is a schematic view of a chain connector according to some embodiments of the present disclosure attached to a machine.

In use, as shown in FIG. 7, the chain connector 1 may be coupled to an attachment plate 15 of the machine 2. The attachment plate 15 may be a part of the chassis 5, a part itself coupled to the chassis 5 or another part of the machine 2. In the example shown the attachment plate 15 is a stanchion that upstands from the chassis 5.

Figure 8:
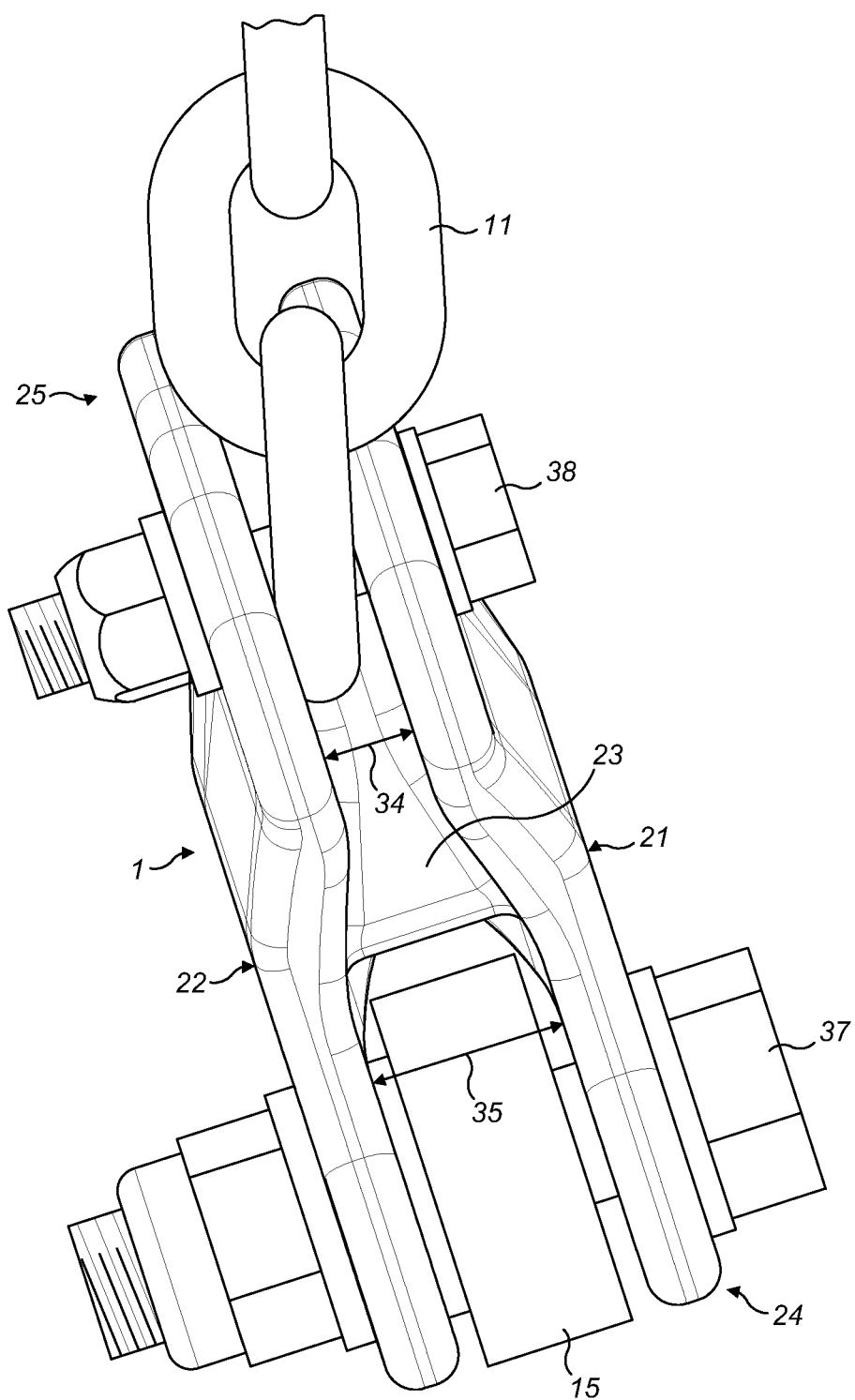
FIG. 8 is a schematic view of a chain connector according to some embodiments of the present disclosure attached to a machine and a chain.

The chain connector 1 may be coupled to the attachment plate 15 by using a fixative, for example a nut and bolt 37, that is connected through the first pair of apertures 26 in the first portions 24 of the first flange 21 and second flange 22 and an aperture in the attachment plate 15. As shown in FIG. 8, the attachment plate 15 may be received in the gap 35 between the first portions 24 of the first flange 21 and the second flange 22. The gap 35 may be sized to be only marginally wider than the thickness of the attachment plate 15. Beneficially, this enables the chain connector 1 to rotate about the attachment plate 15 but limit the twisting of the chain connector 1 out of the plane of the attachment plate 15. This may in practice reduce the out-of-plane loading on the attachment plate 15.

The chain connector 1 may be coupled to a first end of the chain 11 by using a fixative, for example a nut and bolt 38, that is connected through a selected pair of the plurality of second pairs of apertures 27 in the second portions 25 of the first flange 21 and second flange 22 and a link of the chain 11. As shown in FIG. 8, the link of the chain 11 may be received in the gap 34 between the second portions 25 of the first flange 21 and the second flange 22. The gap 34 may be sized to be only marginally wider than the thickness of the link of the chain 11. Beneficially, this enables the chain 11 to rotate about the nut and bolt 38 but limit the twisting of the link of the chain 11 out of the plane of the chain connector 1. This may in practice reduce the out-of-plane loading on the chain connector 1.

The opposite end of the chain 11 may be coupled to the coupling location 12 on the tailgate arm 9.

In operation, during driving of the machine 2 and loading of the container 6, the first configuration of FIG. 1 may be adopted in which the rear opening of the container 6 may be closed by the tailgate 8. In this configuration the chain 11 may extend at a forwards angle towards the tractor 3 from the attachment plate 15.

When the container 6 is to be emptied the container 6 is elevated into the second configuration shown in FIG. 2. During the elevation of the container 6, the chain 11 cooperates with the tailgate arm 9 to pull down on the second end 14 and pivot the tailgate arm 9 about the pivot 10. Consequently the tailgate 8 is moved away from the rear opening of the container 6. In this configuration the chain 11 may extend at a backwards angle towards a rear of the trailer 4 from the attachment plate 15.

Thus, during movement between the first configuration and the second configuration the chain 11 may pivot about the attachment plate 15. Beneficially, the chain connector 1 may assist in this pivoting movement so that pivoting is not reliant only on relative rotation of a chain link and an attachment. Beneficially, the shaping of the chain connector 1, with its relatively narrow first portions 24 and relatively wide second portions 25 may enable the pivoting movement of the chain connector 1 about the attachment plate 15 without interfering with other components of the machine 2, for example wheels 7, wheel arches, sensors, chassis 5, etc.

Beneficially the chain connector 1 may provide an improved mechanism for adjusting the effective length of the tailgate chain linkage. To adjust the length the chain 11 may be coupled to a selected one of the plurality of second pairs of aperture 27. The plurality of different distances $d_1$-$d_7$ may provide fine control of the effective length. For example, the different distances $d_1$-$d_7$ may allow adjustment down to within 10 mm, preferably down to within 5 mm, optionally down to within 2 or 3 mm. For example, the chain connector 1 of FIG. 1 comprises seven second pairs of apertures 27. The minimum distance $d_1$ is 100 mm, distance $d_2$ is 105 mm, distance da is 110 mm, distance $d_4$ is 115 mm, distance $d_5$ is 120 mm, distance $d_6$ is 125 mm, and maximum distance $d_7$ is 130 mm. Thus a fine tuning of the effect chain length to within 5 mm is enabled.

Beneficially, the adjustment does not require the adding or replacement of links of the chain 11. In addition a more precise adjustment of the effective chain length can be achieved compared to adding or removing links of the chain 11.

Beneficially one or more of the spacing of the first flange 21 from the second flange 22, and the spacing of the first apertures from the second apertures may be configured as a chain guide which may assist in maintaining the orientation of the chain 11 and pivoting of the chain 11 about the attachment plate 15.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

The invention claimed is:

1. A chain connector for use with a tailgate chain linkage of a machine, the chain connector comprising:
    a first flange, a second flange and a web extending between the first flange and the second flange;
    the first flange and the second flange each having a first end and a second end;
    the first flange and the second flange comprising pairs of apertures, wherein each pair of apertures comprises a first aperture in the first flange and a second aperture in the second flange with the first aperture and second aperture of each pair of apertures being aligned with each other;
    the pairs of apertures comprising a first pair of apertures disposed in the first ends of the first flange and the second flange for coupling the chain connector to an attachment plate of the machine, and a plurality of second pairs of apertures disposed in the second ends of the first flange and the second flange for coupling the chain connector to a chain of the chain linkage;
    wherein the plurality of second pairs of apertures are disposed at a plurality of distances from the first pair of apertures whereby an effective length of the tailgate chain linkage may be adjusted by coupling the chain of the chain linkage with a selected second pair of apertures of the plurality of second pairs of apertures.

2. A chain connector as claimed in claim 1, wherein each first end is relatively narrow in comparison to each second end.

3. A chain connector as claimed in claim 1, wherein each first end comprises a stem portion and each second end comprises a head portion.

4. A chain connector as claimed in claim 3, wherein each head portion is mushroom-shaped.

5. A chain connector as claimed in claim 3, wherein each head portion comprises a left lateral edge, a right lateral edge and a distal edge.

6. A chain connector as claimed in claim 5, wherein the distal edge is convex and extends from the left lateral edge to the right lateral edge.

7. A chain connector as claimed in claim 5, wherein the left lateral edge and the right lateral edge are concave and both smoothly blend into a left lateral edge and a right lateral edge of the stem portion.

8. A chain connector as claimed in claim 1, wherein the plurality of second pairs of apertures are each disposed at a different distance from the first pair of apertures.

9. A chain connector as claimed in claim 8, wherein the plurality of distances from the first pair of apertures comprise a minimum distance from the first pair of apertures and a maximum distance from the first pair of apertures; wherein the maximum distance minus the minimum distance defines a 'distance range' covered by the plurality of second pairs of apertures; wherein the distance range is up to 50 mm.

10. A chain connector as claimed in claim 9, wherein the minimum distance from the first pair of apertures is between 90 and 110 mm.

11. A chain connector as claimed in claim 9, wherein the maximum distance from the first pair of apertures is between 120 and 140 mm.

12. A chain connector as claimed in claim 1, wherein the plurality of second pairs of apertures are arranged in one or more arcs.

13. A chain connector as claimed in claim 12, wherein the one or more arcs or the single arc subtends an angle centred on the first pair of apertures of between 60° and 120°.

14. A chain connector as claimed in claim 1, wherein the first pair of apertures consists of a single first pair of apertures.

15. A chain connector as claimed in claim 1, wherein the plurality of second pairs of apertures comprises at least 3 second pairs of apertures.

16. A chain connector as claimed in claim 1, wherein the first flange, the second flange and the web are an integral body.

17. A chain connector as claimed in claim 1, wherein the first flange, the second flange and the web are formed as a unitary casting, a unitary moulding, a unitary machined part, or a unitary 3D printed item.

18. A chain connector as claimed in claim 1, wherein the web extends between the second ends of the first flange and the second flange.

19. A chain connector as claimed in claim 1, wherein the second ends of the first flange and the second flange are spaced apart by between 10 and 20 mm.

20. A chain connector as claimed in claim 1, wherein the first ends of the first flange and the second flange are spaced apart by between 25 and 40 mm.

21. A chain connector as claimed in claim 1, wherein one or more of the spacing of the first flange from the second flange, and the spacing of the first apertures from the second apertures are configured as a chain guide.

22. A chain connector as claimed in claim 1, wherein the first flange and the second flange are mirror images of each other.

23. A tailgate chain linkage of a machine, comprising a chain connector as claimed in claim 1 and a chain.

24. A machine comprising a tailgate chain linkage as claimed in claim 23.

* * * * *